(12) United States Patent
Wagenblast et al.

(10) Patent No.: US 6,503,585 B1
(45) Date of Patent: Jan. 7, 2003

(54) HOLLOW-CHAMBER LIGHTWEIGHT COMPONENT

(75) Inventors: Joachim Wagenblast, Köln (DE); Boris Koch, Wermelskirchen (DE); Hubert Goldbach, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/419,520

(22) Filed: Oct. 18, 1999

(30) Foreign Application Priority Data

Oct. 21, 1998 (DE) .......................... 198 48 516

(51) Int. Cl.[7] ................. B29D 22/00; B29D 23/00; B32B 1/08; B32B 27/00; B65D 19/38
(52) U.S. Cl. .............. 428/34.1; 428/35.8; 428/425.8; 108/51.11; 108/52.1; 108/56.3; 108/57.12; 108/57.26; 108/57.33; 108/57.34; 108/901; 108/902
(58) Field of Search ............... 428/34.1, 35.8, 428/425.8; 108/57.26, 901, 902, 51.11, 56.3, 57.34, 57.33, 52.1, 57.12

(56) References Cited

U.S. PATENT DOCUMENTS

| | | | | |
|---|---|---|---|---|
| 3,462,330 A | | 8/1969 | Greig et al. ............... | 156/197 |
| 3,695,187 A | * | 10/1972 | Weiss .......................... | 108/54 |
| 4,843,976 A | * | 7/1989 | Pigott et al. ................ | 108/56.1 |
| 5,046,434 A | * | 9/1991 | Breezer et al. ............ | 108/51.1 |
| 5,190,803 A | | 3/1993 | Goldbach et al. ........... | 370/138 |
| 5,667,908 A | * | 9/1997 | Stone .......................... | 429/96 |

* cited by examiner

*Primary Examiner*—Shrive P. Beck
*Assistant Examiner*—Elena Tsoy
(74) *Attorney, Agent, or Firm*—Joseph C. Gil; James R. Franks

(57) ABSTRACT

A hollow-chamber lightweight component is described which at least comprises a shell-shaped housing part (1) made of high-strength material. a ribbed supporting structure (2) made of plastic, in particular of thermoplastic material, and at least one cover plate (4) or covering shell (20) made of a high-strength material which is, in particular. different from plastic and a method of producing the lightweight component is described. The supporting structure (2) is up against the inside of the housing part (1) and is joined, in particular. to the housing part (1). The cover plate (4) or covering shell (20) largely covers the space formed from housing part (1) and supporting structure (2) and is joined in its peripheral region at least with one part of the boundary (10) of the housing part (1).

27 Claims, 10 Drawing Sheets

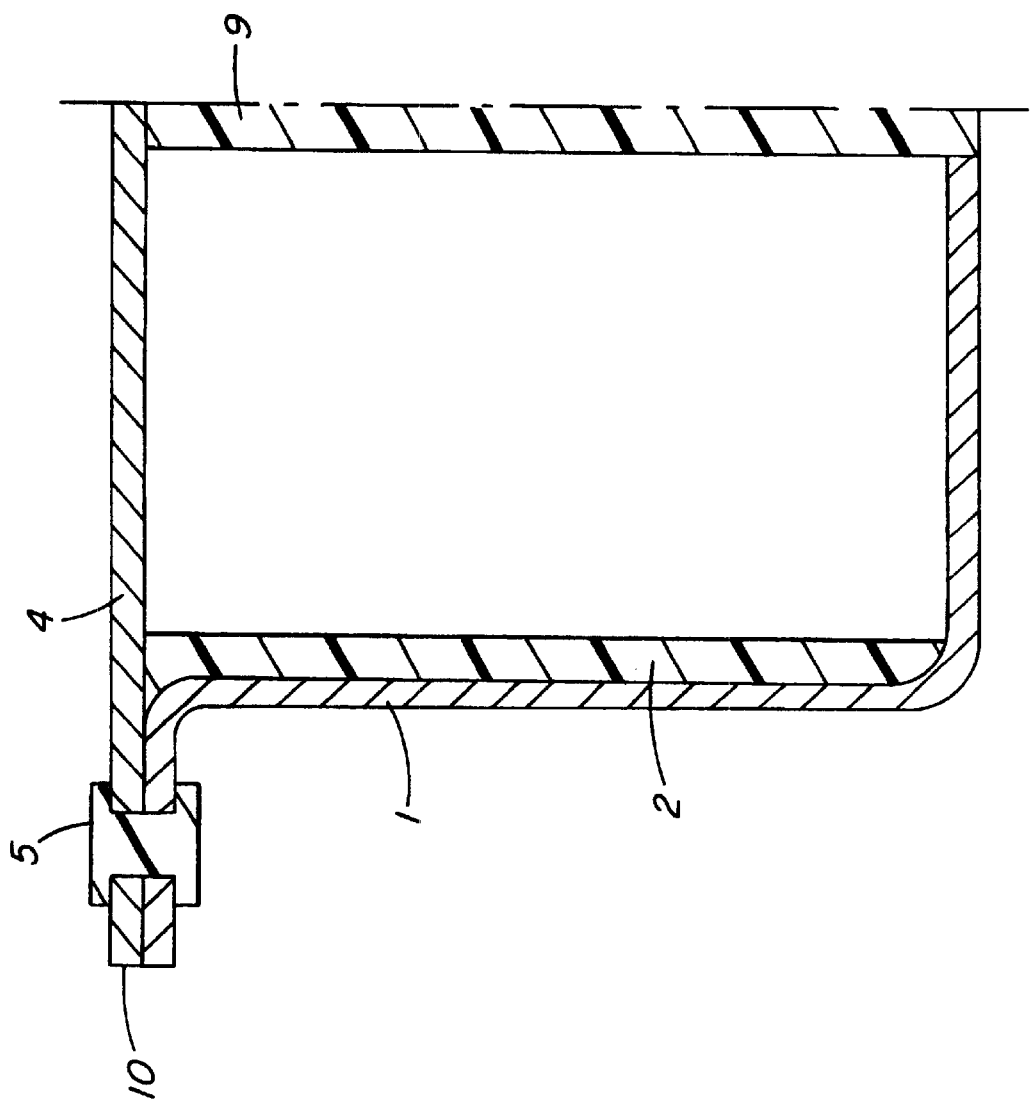

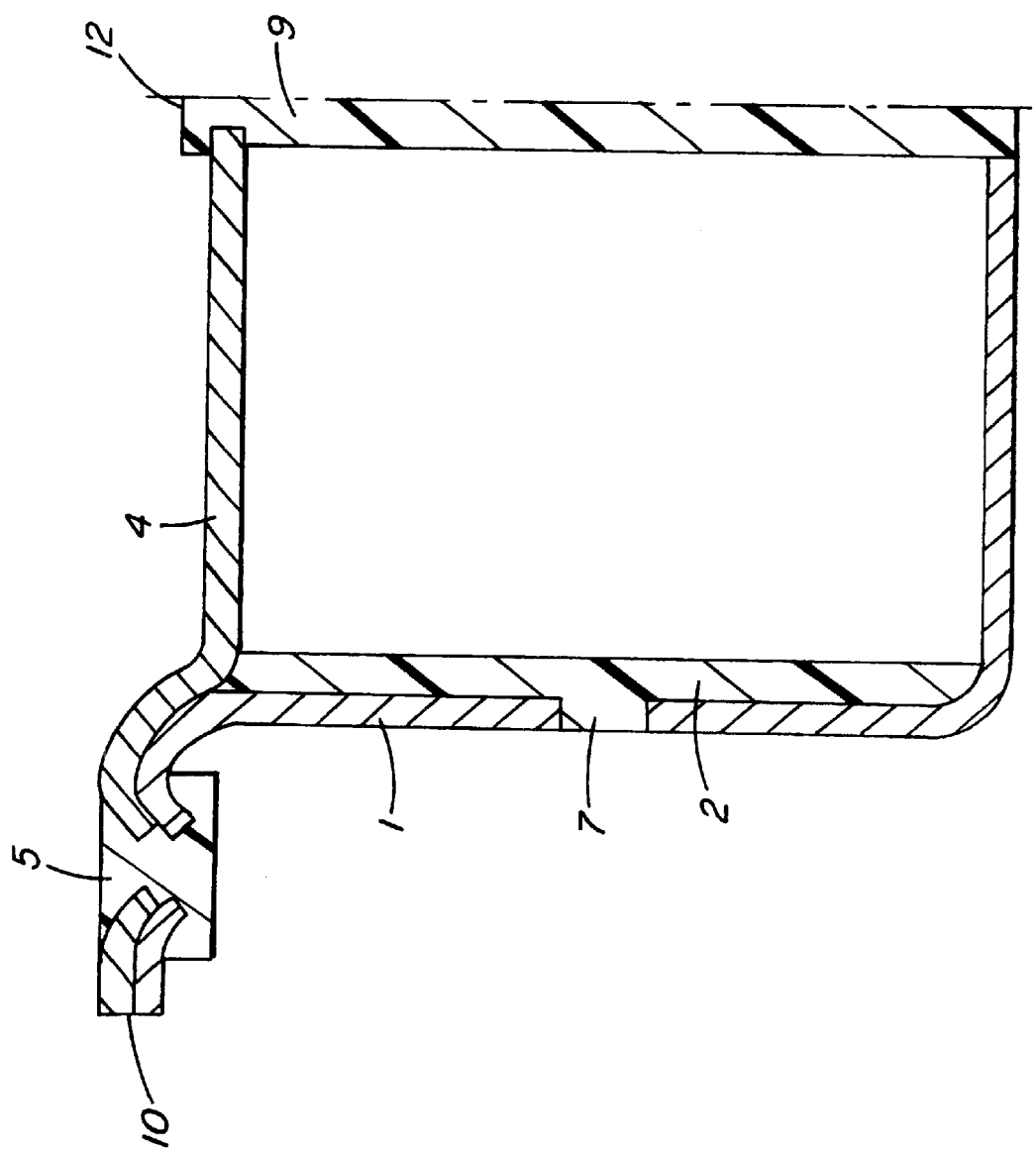

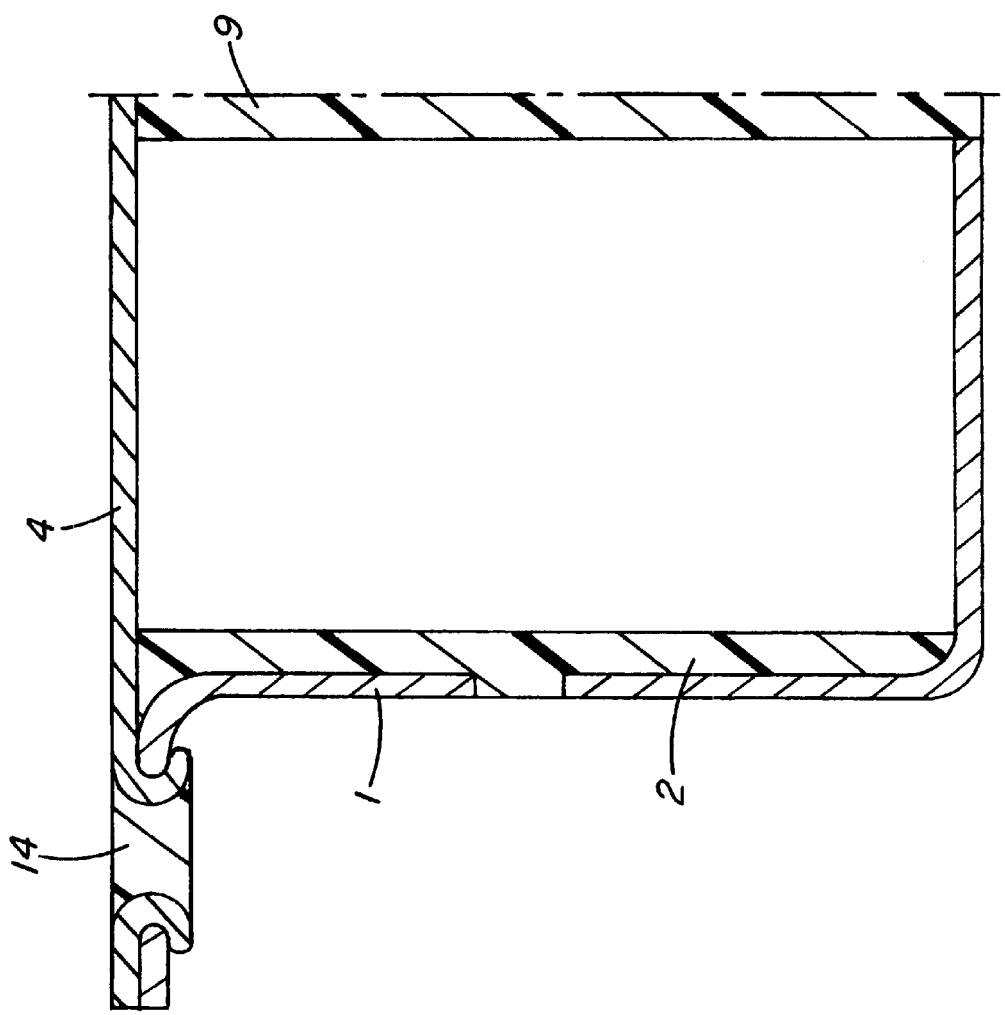

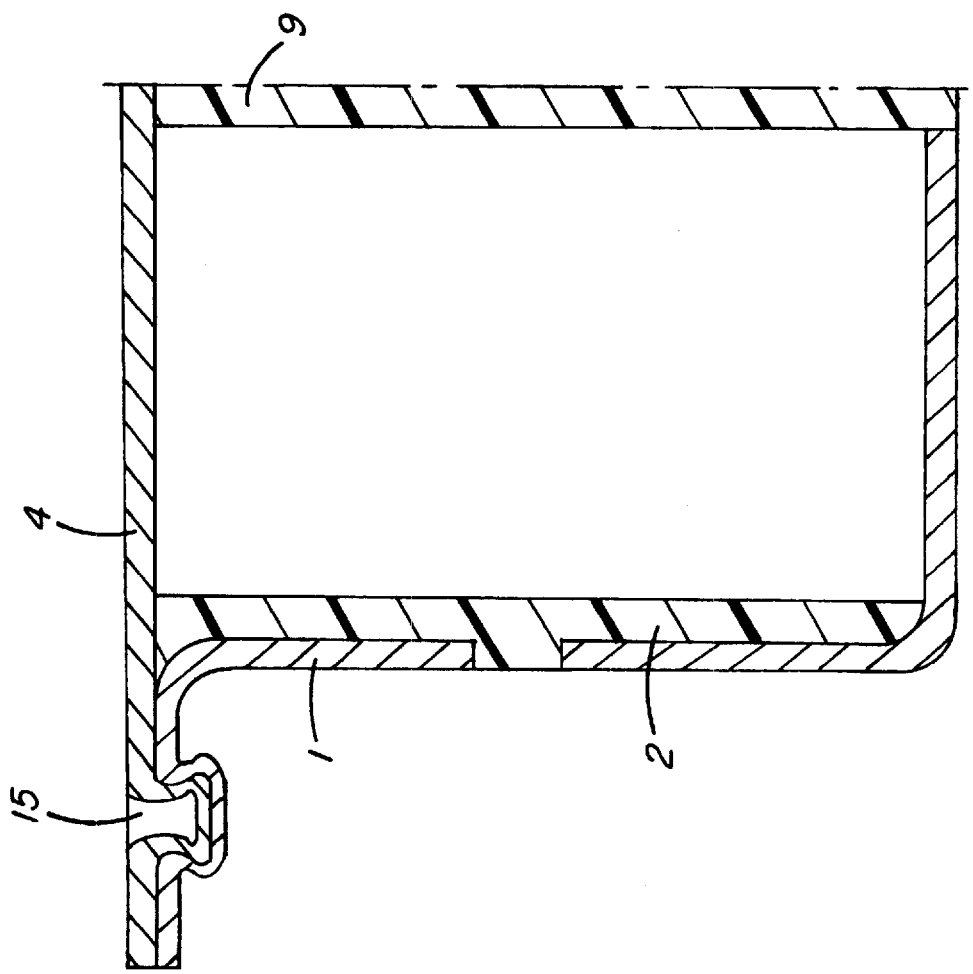

HOLLOW-CHAMBER LIGHTWEIGHT COMPONENT

CROSS REFERENCE TO RELATED APPLICATIONS

The present patent application claims the right of priority under 35 U.S.C. 119 (a)–(d) of German Patent Application No. 198 48 516.6, filed Oct. 21, 1998.

FIELD OF THE INVENTION

The invention relates to a hollow-chamber lightweight component suitable for transmitting high mechanical loads. comprising at least one shell-shaped housing part made of high-strength material. a ribbed supporting structure made of plastic and a cover plate or shell which largely covers the space formed from housing part and supporting structure and is joined to the housing part, and also a method for producing the lightweight component.

The lightweight component is a hollow-chamber hybrid part comprising an external skin made of a high-strength, for example ductile, material, for example steel and a rib structure which at least partly fills the cavity of the housing part and is made of a readily mouldable material which supports the outside skin, for example made of thermoplastic material.

BACKGROUND OF THE INVENTION

The highly loadable lightweight components used in practice comprise either closed sections (for example box-type sections with square, rectangular or circular cross section) or open sections (for example I-, V-, L-. T- or double-T-girders) or elements made of welded or bonded metal sheets or reinforced plastic panels. Also known are open metal/plastic hybrid sections or hybrid sections (EP 0370342 A3) comprising a high-strength. shell-shaped external skin provided with a rib structure which supports the shell.

Compared with hollow-chamber sections or components. open sections or components have a generally lower rigidity and strength. Compared with such components having supporting rib structure, lightweight components without supporting rib structure have the disadvantage that they collapse when appropriately stressed as a result of buckling. This takes place at a loading which is markedly below the strength properties of the material. If open hybrid sections or parts having supporting rib structures are compared with known hollow-chamber lightweight components without supporting rib structure, open hybrid sections have a rigidity and strength which is in total markedly lower despite the rib structure.

SUMMARY OF THE INVENTION

The object of the invention is therefore to provide a component of the type mentioned at the outset which has both the high rigidity and strength of known hollow chamber profiles or parts made of metal and has a considerably lower tendency to collapse as a result of buckling than hybrid sections or parts (corresponding to EP 370 342). In addition. the energy absorption capability during the deformation of the component is to be markedly increased. in particular in the overload region.

According to the invention. this object is achieved in that a component is provided which comprises at least one partly closed hollow chamber section or part which is mechanically supported by a rib structure disposed in the hollow chamber.

BRIEF DESCRIPTION OF THE DRAWINGS

FIG. 2 shows the part view of a plan view of the light weight component similar to FIG. 1 with a plastic rivet joint;

FIG. 3 shows the part view of a lightweight component similar to FIG. 1 with plastic rivet joint and with supporting structure 9 joined to the cover part 4;

FIG. 4 shows the part view of a lightweight component similar to FIG. 1 with a flange joint of section 1 and cover part 4;

FIG. 5 shows the part view of a lightweight component similar to FIG. 1 with a clinch joint of profile 1 and cover part 4;

DETAILED DESCRIPTION OF THE INVENTION

Figure 1:
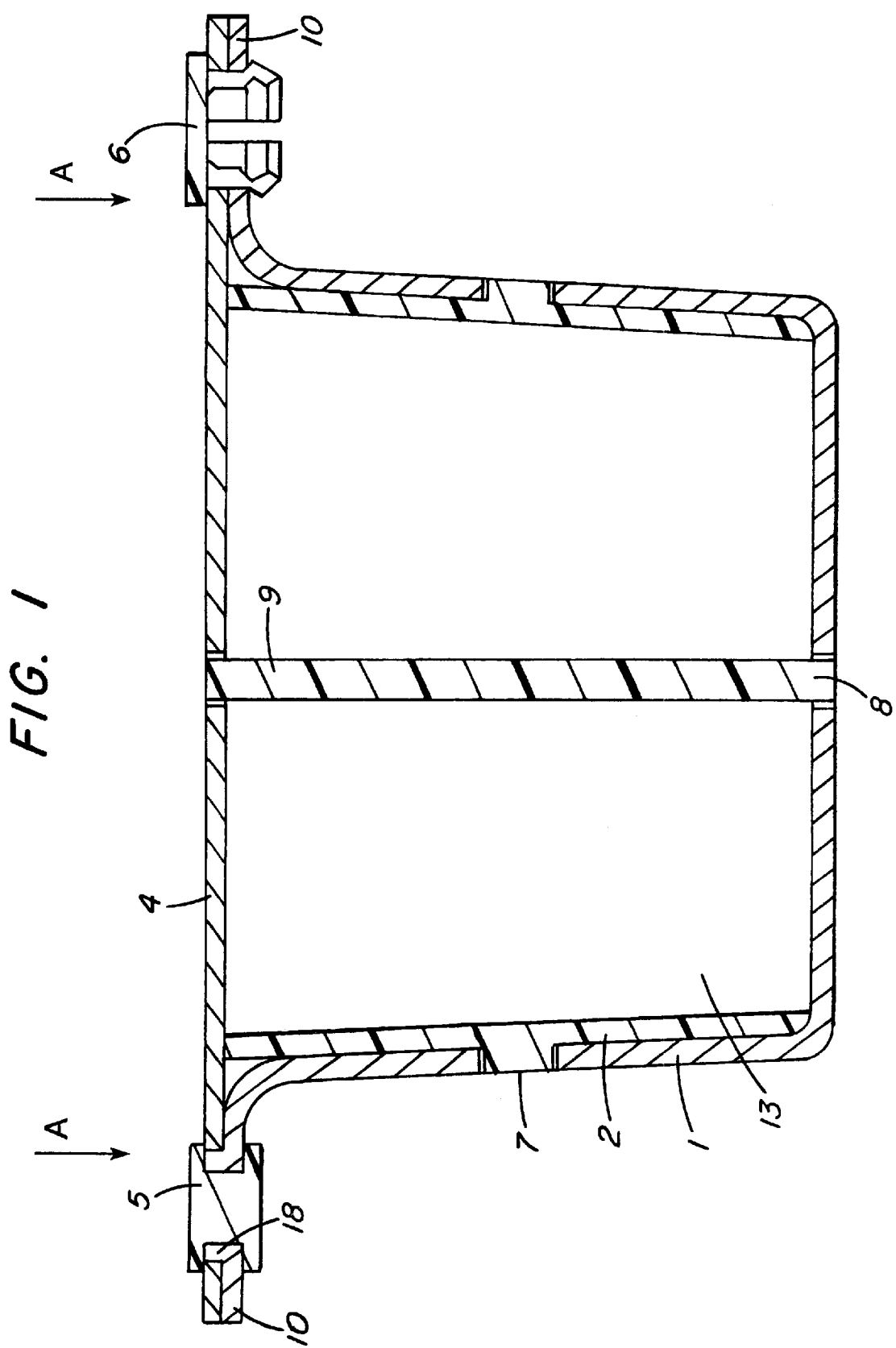
FIG. 1 shows the cross section through a lightweight component according to the invention.
Figure 1A:
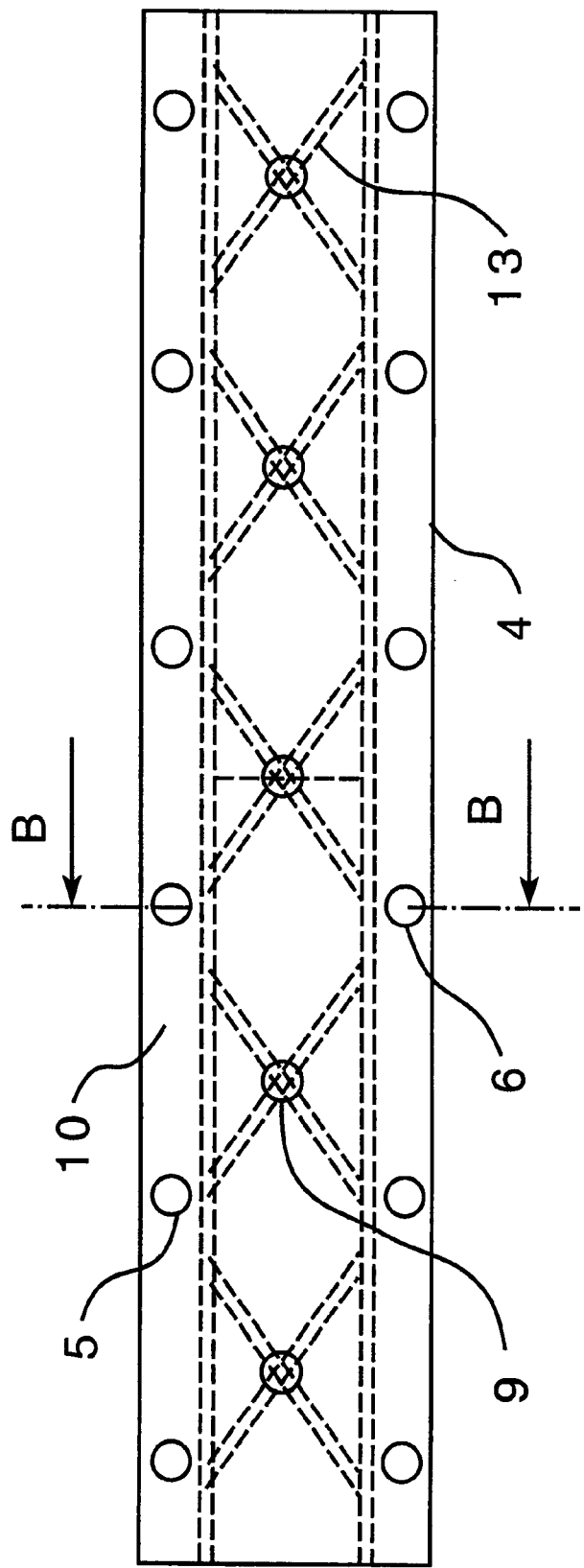
FIG. 1a shows the part view of a plan view of the light weight component according to FIG. 1.

The invention relates to a highly mechanically stressable hollow-chamber lightweight component at least comprising at least one shell-shaped housing part made of high-strength material in particular made of a material different from plastic in particular preferably made of metal and a supporting structure made of plastic in particular made of thermoplastic material, wherein the supporting structure is up against the inside of the housing part and in particular is joined to the housing part and at least one cover plate or covering shell made of a high-strength material which is in particular, different from plastic, in particular made of metal which largely covers the cavity formed from the housing part and supporting structure and is joined in its peripheral region at least with one part of the peripheral region of the housing part.

The supporting structure may also be up against the cover plate or the covering shell.

The external skin of the component comprises at least two parts (housing part and metal cover sheet), which are made of a high-strength material (for example, steel, aluminium, magnesium or plastic composites).

A pipe is also conceivable into which a supporting structure is inserted and whose ends are optionally closed. In this case, housing part and covering shell are formed integrally.

The supporting structure is a ribbed supporting structure and is preferably made of an optionally fibre-reinforced thermoplastic material (for example, PA, PBT, PB, ABS. PC. and also mixtures of said materials in a reinforced form (for example reinforced with glass fibres) and an unreinforced form.

Ribbed supporting structure is understood as meaning a spatial body which supports the walls of the lightweight component from the inside and uniformly distributes forces which act on the component. The supporting structure may have parallel ribs. ribs which are at an angle to one another or ribs which cross one another.

Preferred is a lightweight component in which the supporting structure is joined to the housing part in a positive-locking manner, in particular by means of injection moulding.

Particularly preferably, the supporting structure is joined to the housing part in a positive-locking manner by studs which are moulded onto the supporting structure and are reshaped to form plastic rivets.

A variant of the lightweight component is characterized in that the cover plate or the covering shell is likewise provided with a supporting structure made of plastic.

The cover plate or covering shell may be partly or completely oversprayed or sheathed with thermoplastic material on its outside, in particular in the region of its joint to the housing part.

Advantageously, the lightweight component is designed so that the cover plate or covering shell is mutually joined in a positive-locking manner to the housing part at points situated directly on top of one another, in particular in the region of perforations in the covering shell and housing part situated above one another by means of thermoplastic material.

In a preferred variant of the lightweight component, the covering shell or the cover plate is joined to the supporting structure and/or the housing part by welding or by means of plastic rivets which are applied, for example, by ultrasonic welding (also referred to as stud welding), plastic studs provided on ribs of the supporting structure engaging in a positive-locking manner in reentrants of the housing part or of the covering shell or of the cover plate.

The covering, shell or the cover plate may be joined to the supporting structure and/or the housing part by welding faces which are situated on top of one another, in particular by friction welding to produce for example, a plastic/plastic or plastic/material joint. by welding edges situated on top of one another, by spot welding, bonding, flanging, clinching, riveting, plastic-riveting, stud welding of plastic studs or any desirable combination of these methods.

The supporting structure is joined to the wall of the housing part preferably by means of injection-moulded positive-locking joints in the region of perforations and/or corrugations in the wall of the housing part.

The supporting structure may also be joined to the housing part in a positive-locking manner by means of plug joints or snap joints.

Alternatively or additionally, the supporting structure may be joined to the housing part in a material-locked manner by bonded and/or welded joints.

The housing part and the cover plate or the covering shell are composed, independently of one another, in particular of metal sheet, preferably of steel or aluminium sheet, or of diecast parts, preferably made of aluminium, zinc or magnesium or of fibre-reinforced plastic or plastic composites.

The plastic of the supporting structure of the lightweight component is preferably a thermoplastic material which is, in particular, reinforced and/or filled and is preferably a polycarbonate (PC), polyester, polyurethane, polystyrene, ABS, polyamide (PA), polybutylene terephthalate (PBT) or polypropylene (PP).

The lightweight component may have partly functional openings in the housing part, cover plate or covering shell to the space formed from housing part and cover plate or covering shell.

Alternatively, it is possible to design the lightweight component so that the supporting structure is only laid in the housing part. The supporting structure is fixed under these circumstances by the joint of the housing part and cover plate or covering shell.

The hollow chamber hybrid component can be produced in various ways. In this connection, it is predominantly the nature of the attachment of the rib structure to the housing part and also the joining of the various outer parts which differ:

1. Positive-locking attachment of the rib structure to the housing part by material reshaping.

In this preferred production method, the attachment can be achieved both by injection moulding and by plastic riveting by means of joining elements previously moulded on. In both cases, the housing part is provided with perforations (for example, metal sheet with bores) through which a positive-locking bond to the rib structure is achieved.

In the case of attachment by injection moulding, an open housing part is first laid in an injection-moulding tool. Both the moulding of the rib structure and the attachment to the housing part are achieved by the injection-moulding process. Since the plastic material is poured into the injection moulding tool in liquid form, it is able to flow through the perforations into the housing part and form a rivet head on the rear of the perforations. The hollow chamber component is then completed by applying (for example welding) at least one further external part—designated here as cover plate or covering shell.

An attachment of the rib structure to the housing part can also be achieved in a similar way if plastic riveting is used (stud welding). In this case, the rib structure is first moulded separately without housing part but with moulded on joining studs. The external parts (housing part and cover plate) are then placed around the rib structure, in which process the joining studs project through the perforations in the external parts. The joining studs are then reshaped with the aid of a reshaping process (for example. by ultrasonic welding) to form a rivet head. In this procedure. the lightweight component can be completed by this final welding operation by the necessary outer parts being disposed in an appropriate way around the rib structure.

2. Positive-locking joining of the rib structure to the housing part by insertion, plugging or snapping.

In this further preferred method, a separate rib structure is likewise first produced. Here, too, there are again a plurality of possibilities. On the one hand, the rib structure may be moulded from an extruded section which is simply placed between the outer parts of the lightweight component (the housing part and cover plate or covering shell). The positive locking is then obtained by joining the outer parts. An injection-moulded rib structure with moulded on studs can also be used. on the other hand, which studs are likewise disposed between the outer parts of the lightweight component in order then to achieve a positive locking between rib structure and outer partby joining the outer parts of the lightweight component. In this case, the moulded-on studs of the rib structure are plugged into perforations of the outer parts in order to achieve an improved attachment of the rib structure to the outer skin.

3. Joining of the outer parts of the lightweight component by reshaping the material of the rib structure.

The outer parts (housing part and cover plate/covering shell) can also be joined together in a manner similar to the attachment of the rib structure to the outer parts of the lightweight component. In this case, joining studs of the rib structure moulded on beforehand can likewise be used in order to achieve a positive locking between rib structure and the various outer parts and/or directly between the outer parts with the aid of a reshaping process. If the joint is to be achieved by means of injection moulding, the outer parts must be situated directly on top of one another or must be only at a short distance from one another. This can be achieved in particular, in the peripheral region of sections or partially at corrugations. If the joint is made by reshaping the joining studs by means of ultrasound. direct joints of ribs to outer parts are also possible.

4. Material-locked or positive-locked joining of the outer parts of the lightweight component.

A direct material-locked or positive-locked joining of the outer parts (housing part and cover plate/covering shell) of the lightweight component can be achieved if metal sheets are used by spot welding, clinching (i.e. joining of two or more sheets situated above one another by partial deformation of certain points in the sheets to form a mushroom-shaped recess which results in a positive-locked joining of the sheets) or by bonding. If the outer parts are made of plastic composites, partial welding or likewise bonding can be used.

Further possibilities of joining the outer parts are to use various combinations of the methods mentioned above under 1 to 4. Accordingly, there is the possibility of achieving positive locking between the outer parts by providing, in both parts congruent corrugations which are additionally provided via a perforation with a rivet joint by reshaping joining studs moulded onto the rib structure.

The invention furthermore relates to a method for producing highly mechanically stressable lightweight components as a plastic/material composite in a hybrid structure comprising at least one shell-shaped housing part, at least one cover plate or covering shell and a supporting structure enclosed by said parts which is characterized in that at least one housing part made of a high-strength material or a material composite is provided on its inside with a supporting structure made of plastic and is then joined to a cover plate or covering shell made of a high-strength material or material composite to form a hollow-chamber lightweight component.

Preferably, in a first step, the supporting structure is applied to a housing part by injection moulding and the ribs of the supporting structure are joined in a second step to the wall of the second housing part in a positive-locking manner by reshaping studs which are a component of the supporting structure.

A preferred method is characterized in that, prior closing the housing part, the cover plate or the covering shell is provided with its own plastic supporting structure and/or partly or completely oversprayed or sheathed with plastic.

The cover plate or covering shell can be mutually joined in a positive-locking manner to the housing part at points situated directly on top of one another, in particular in regions of perforations situated above one another and held by means of thermoplastic material.

In this case the positive locking exists both between the housing parts and between plastic rivet and housing parts.

A variant of the method is characterized in that the covering shell or the cover plate is joined to the supporting structure and/or the housing part by welding or by means of plastic-riveting, plastic studs provided on ribs of the supporting structure engaging in a positive-locking manner in reentrants of the housing part or of the covering shell or of the cover plate.

Preferably, the covering shell or the cover plate is joined to the supporting structure and/or the housing part by welding surfaces situated above one another (in particular. by friction welding to produce a plastic/plastic or plastic/material joint), by welding edges situated above one another, by spot welding, bonding, flanging, clinching riveting, plastic riveting, stud welding of plastic studs or any desired combination of these methods. Regardless of the said types of joining, the supporting structure can be anchored to the housing part in a positive-locking manner by plugging or snapping prior to closing the housing part.

It is also possible to join the supporting structure to the housing part in a material-locked manner by bonding and/or welding prior to closing the housing part.

The advantages achieved by the invention may be described as follows: properties are compared in this case of a closed, cross-ribbed lightweight component comprising a U-section as housing part which contains a plastic rib structure and is joined to a cover sheet by spot welding with an open plastic/metal hybrid girder having comparable rib structure and also a hollow chamber section made of steel sheet having in each case the same external dimensions. (The property values are based on components having the same weight):

The maximum bending load in the case of a cross-ribbed lightweight component is increased by 30% compared with the open hybrid girder and also by 60% compared with the hollow chamber section made of steel sheet.

The torsional rigidity in the case of the cross-ribbed lightweight component is 100% higher compared with the open hybrid girder (same torsional rigidity compared with the pure steel sheet section).

The energy absorption capability of the cross-ribbed light component is approximately 100% higher both when compared to the open hybrid girder and to the hollow chamber section made of steel sheet.

Compared with the open hybrid profile: with the lightweight component, any desired installation position is possible (for example with loading of an open hybrid U-section on the open side buckling of the chords since pressure stressing of the latter occurs). As a result a very high bending rigidity of the lightweight component is achievable.

Compared with a known section made of steel sheet, the closed lightweight component has a more favourable force introduction since, in this case, the steel sheet is supported by the internal rib structure.

The advantages described were obtained by means of initial mechanical tests. With optimum configuration of the closed lightweight component (for example, by arranging ribs of the rib structure in the longitudinal and transverse directions of the section-shaped housing part and positive-locked joining of U-section and cover sheet) the property values can be markedly increased further.

The invention also relates to the use of the lightweight component according to the invention as longitudinal girder, cross girder, underbody component, suspension arm, energy absorbing side or front wall or as bumper bar in vehicle construction or aircraft construction.

The use of the lightweight component according to the invention as junction element for joining girders, in particular in vehicle construction, is preferred.

The invention is explained in greater detail by way of example below with reference to the figures without the invention thereby being restricted in detail.

EXAMPLES

Girder Elements Made of Closed Top-hat Sections with Internal Rib Structure, FIGS. 1 to 7.

FIGS. 1 to 7 show top-hat sections comprising a U-section 1, which has been closed with a cover sheet 4. The internal rib structure 2 was in this case first introduced into the open U-section by means of injection moulding. The cover sheet 4 was then applied by various methods.

FIG. 1 shows a section which is held together in the flange region 10 between U-section 1 and cover sheet 4, on the one hand, by a plastic rivet joint 5 and, on the other hand, by a snap joint using an additional snap element 6. The plastic rivet joint 5, which is reinforced in this exemplary embodiment by a positive lock 18 between U-section 1 and cover sheet 4, may be produced both by injection moulding and by ultrasonic welding. The rib structure 2 itself is attached in a positive-locking manner to U-section 1 and cover sheet 4 by means of moulded-on joining elements 7, 8. The additional joining of U-section 1 and cover sheet 4 by means of central struts 9 inside the rib structure 2 increases the rigidity of the girder.

FIG. 2 describes a simple girder in which U-section 1 and cover sheet 4 are joined only in the flange region 10 by means of a plastic rivet 5.

In FIG. 3, U-section 1 and cover sheet 4 are joined with the aid of plastic rivet joints 12, 13 both in the flange region 10 and over the central struts 9 of the rib structure 4. The rivet joint 13 in the flange region 10 may be made both by injection moulding and by ultrasonic welding. The rivet joint 12 in the region of the central struts 9 of the rib structure 4 can be achieved only by ultrasonic welding.

The joining of U-section 1 and cover sheet 4 is achieved by means of flanging in the lightweight component according to FIG. 4. In this case, the bores 14 in the ductile cover sheet 4 are deformed in such a way that a positive-locking joint of the cover sheet 4 to the U-section 1 results.

In the variant of the lightweight component according to FIG. 5, a positive-locking joint is likewise achieved between U-section 1 and cover sheet 4 in the flange region by means of "clinching". In this case, U-section 1 and cover sheet 4 are deformed at the joints 15 jointly with the aid of a combination of deep drawing with subsequent upsetting to form a positive-locking joining element.

Figure 6:
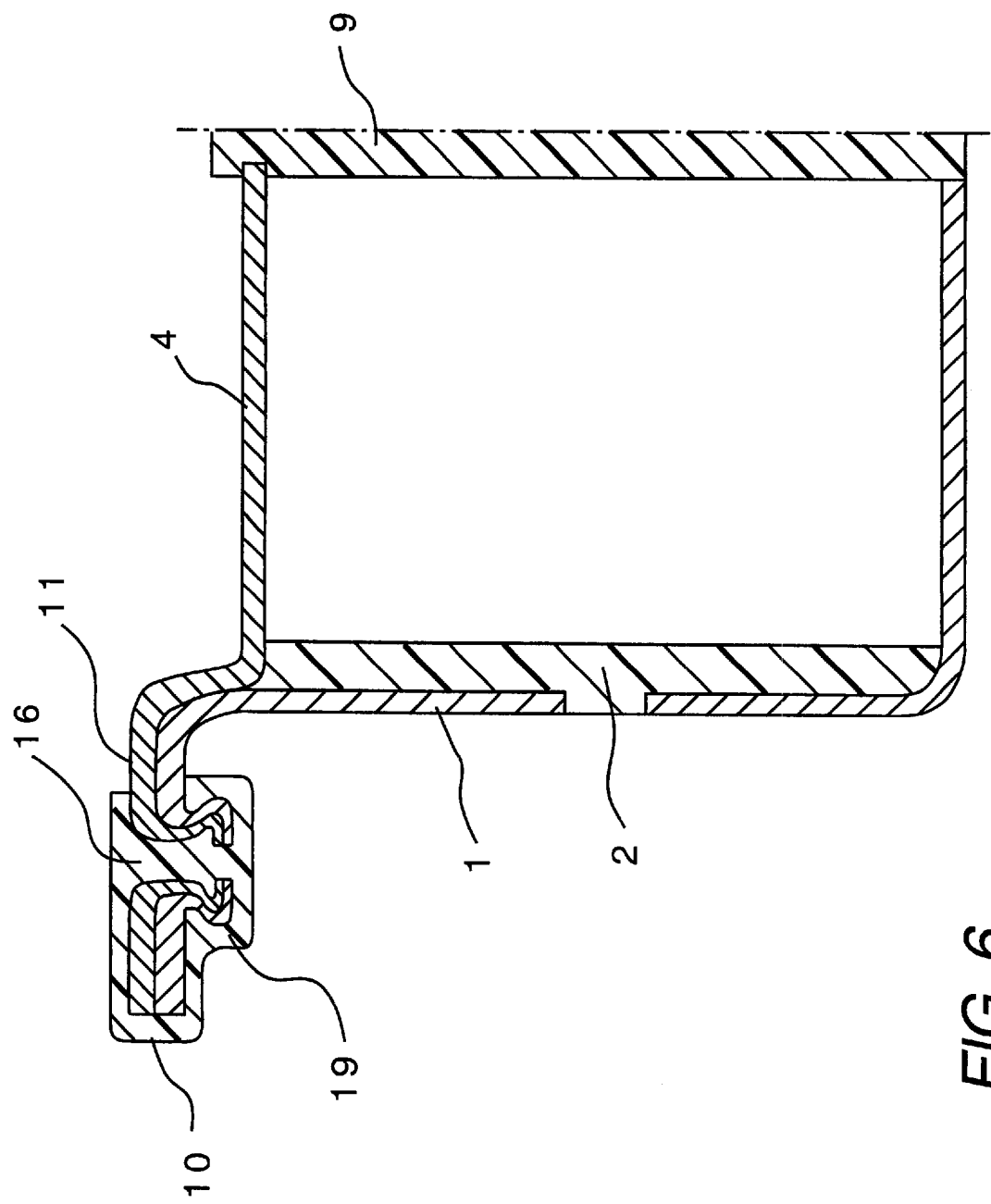
FIG. 6 shows the part view of a lightweight component similar to FIG. 1 with a clinch joint of section 1 and cover part 4 and additional plastic injection moulding encapsulation 19.

The exemplary embodiment according to FIG. 6 shows a part view of a lightweight component with joining elements in the flange region 10 between U-section 1 and cover sheet 4 which are obtained initially by clinched bores 16 which are then also additionally secured by overspraying 19 with plastic.

Figure 7:
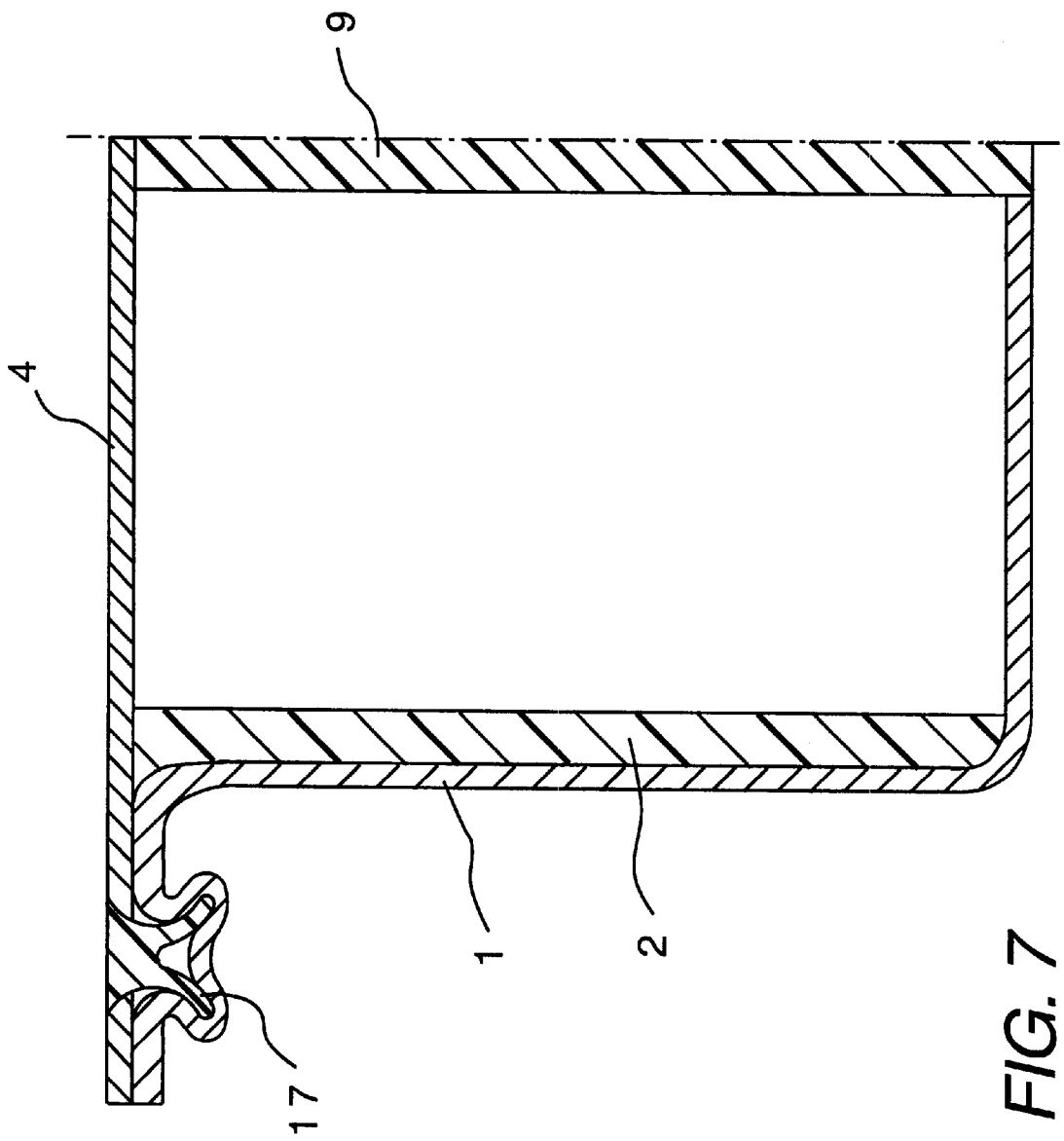
FIG. 7 shows the part view of a lightweight component similar to FIG. 1 with a clinch joint of section 1, joint part 17 and cover part 4.

In the lightweight component according to FIG. 7, the joint between U-section 1 and cover sheet 4 is likewise achieved by clinching. In this exemplary embodiment, however, an additional deformable joint part 17 is also used which secures the joint between cover sheet 4 and section 1.

Figure 8:
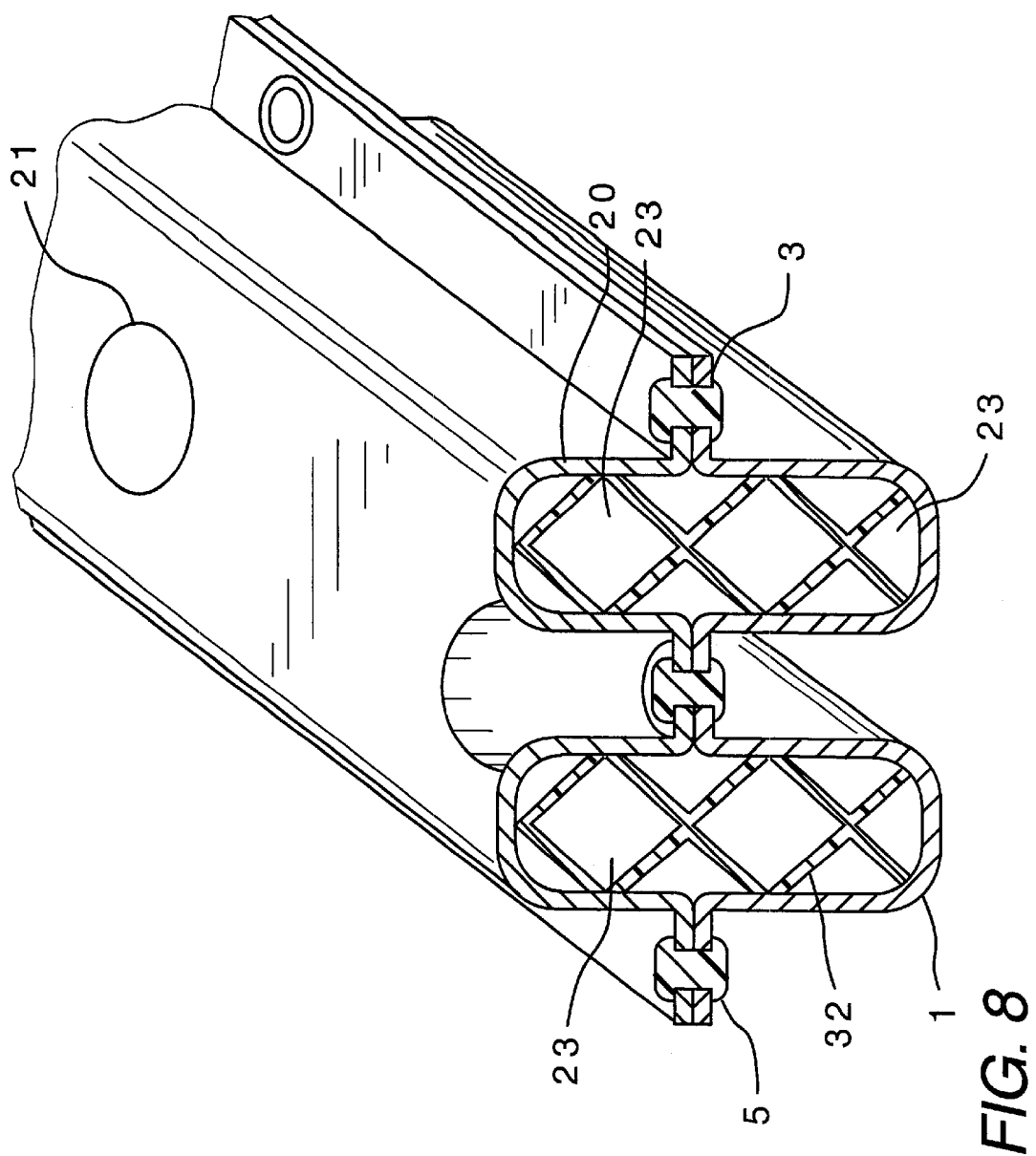
FIG. 8 shows a plan view and section through a lightweight component in the form of a double-top-hat section.

Girder Comprising Double Top-hat Section with Internal Rib Structure—FIG. 8

FIG. 8 shows a double top-hat section which has joints 21 at a plurality of points on the longitudinal axis of the sections 20 and 1. Housing part 1 and covering shell 20 are in this case section sheets of identical shape which make contact at various connection surfaces. At the joints 21, the section sheets 1, 20 have openings 3 situated above one another. The joints 21 are held together at the openings 3 by plastic rivets 5 which can be formed both by injection moulding and by ultrasonic welding. The internal rib structure 32 is in this case produced by extrusion. It is simply laid in the cavities 23 of the U-sections 1 and 20 and held in the girder 20, 1 by joining the sections in a positive-locking manner.

Figures 9, 9A:
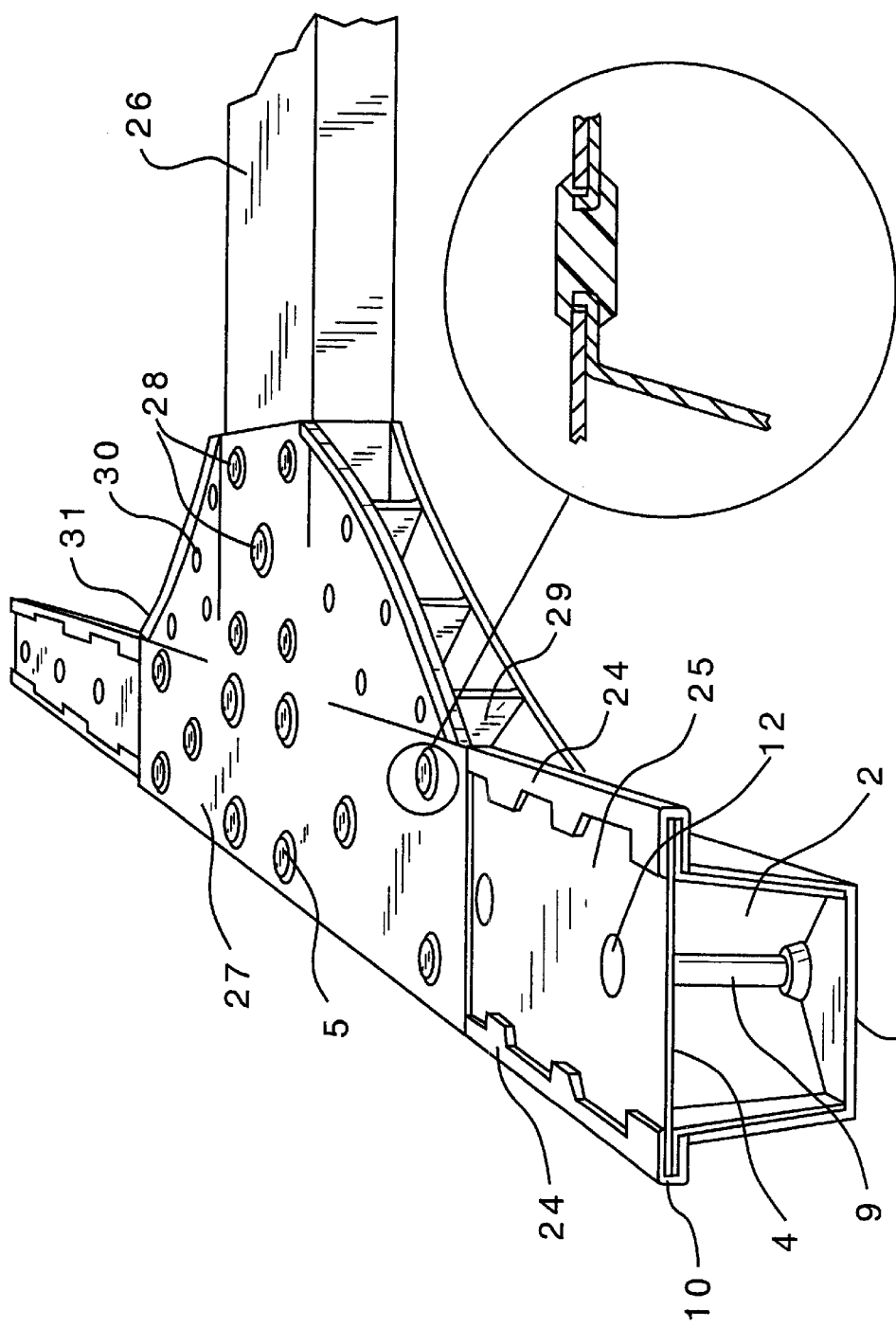
FIG. 9 shows a T-junction joint of two lightweight components according to the invention to a conventional metal girder.
FIG. 9a shows an isolated sectional view of a plastic rivet joint 5 of the T-junction joint of FIG. 9.

Closed Carrier with Junction Element—FIG. 9

FIG. 9 shows the joining of two girders in the form of a T-junction. In this case, a closed plastic/metal hybrid girder 25 is joined to a pure metal girder 26. The closed hybrid girder 25 comprises a U-section sheet 1 and a cover sheet 4, and also an internal rib structure 2. The U-section 1 and the cover sheet 4 are joined at a plurality of points. On the one hand, joining elements were created with the aid of the plastic rivets 5 or 12 in the flange region 10 and in the region of the struts 9 of the rib structure 2 (like in the embodiment in FIGS. 1 and 3). On the other hand, the strength of the joint between U-section 1 and cover sheet 4 is increased still further by the injection-moulding encapsulation 24 at the edge in the flange region 10 (comparable to the cross section according to FIG. 6).

The two girders 25 and 26 are joined by two joining sheets 27 which are joined to the hybrid girder 25 by means of plastic rivets 5 and to the pure metal girder 26 by means of the plastic rivets 28. The further rib structures 29 provided between the joining sheets 27 by means of plastic rivets 30 and injection-moulding encapsulation 31 of the edges prevent a premature buckling of the joining sheets 27, as a result of which a reinforcement of the entire T-junction is achieved. So that the rib structures 29 are always pressure-stressed, the joining sheets 27 are bowed inwards in the region of the rib structures 29.

Parts List for FIGS. 1–9

Housing part: U-section (1), supporting structure; rib structure (2) openings 3 cover plate; cover sheet (4) plastic rivet joint (5) snap element (6) moulded-on joining elements (7, 8) struts (9) peripheral region; flange region (10) plastic rivet joints (12, 13) bores (14) joints (15) clinched bores (16) joint part (17) positive lock (18) covering shell; section (20) joining elements (21) recesses (23) edge injection moulding (24) hybrid girder (25) metal girder (26) joining sheets (27) plastic rivets (28) rib structures (29) plastic rivets (30) and edge injection moulding (31).

What is claimed is:

1. A hollow-chamber lightweight component comprising:
    at least one shell-shaped housing part (1) having a boundary (10) and being made of a material selected from at least one of plastic and metal;
    a ribbed supporting structure (2) made of plastic, wherein the supporting structure (2) is up against the inside of the housing part (1) and is optionally joined to the housing part (1); and
    at least one cover plate (4) or covering shell (20) each having a peripheral region and being made of a material which is different from plastic, which largely covers the space formed from the housing part (1) and the supporting structure (2) and is joined in its peripheral region at least with one part of the boundary (10) of the housing part (1).

2. The lightweight component of claim 1 wherein the supporting structure (2) is joined to the housing part (1) in a positive-locking manner, by means of injection moulding.

3. The lightweight component of claim 1 wherein the supporting structure (2) is joined to the housing part (1) in a positive-locking manner by studs which are moulded onto the supporting structure (2) and are reshaped to form plastic rivets.

4. The lightweight component of claim 1 wherein the cover plate (4) or the covering shell (20) is provided with a supporting structure (32) made of plastic.

5. The lightweight component of claim 1 wherein the cover plate (4) or covering shell (20) has a partial or complete sheathing or overspraying of thermoplastic material on its outside (11), in the region of its joint to the housing part (1).

6. The lightweight component of claim 1 wherein the cover plate (4) or covering shell (20) is mutually joined to the housing part (1) in a positive-locking manner at points situated directly on top of one another, in a region of perforations (3) situated above one another, by means of thermoplastic material.

7. The lightweight component of claim 1 wherein the covering shell (20) or the cover plate (4) is joined to at least one of the supporting structure (2) and the housing part (1) by welding or by means of plastic studs (8) provided on ribs (9) of the supporting structure (2) which are reshaped to form plastic rivets that engage in a positive-locking manner in reentrants of the housing part (1) or of the covering shell (2) or of the cover plate (4).

8. The lightweight component of claim 1 wherein the covering shell (2) or the cover plate (4) is joined to at least one of the supporting structure (2) and the housing part (1) by welding edges situated above one another, by at least one method selected from the group consisting of spot welding, bonding, flanging, clinching, riveting, plastic riveting, and stud welding of plastic studs.

9. The lightweight component of claim 1 wherein the supporting structure (2) is joined to the wall of the housing part (1) by means of injection-moulded positive-locking joints in a region of at least one of perforations and corrugations in the wall.

10. The lightweight component of claim 1 wherein the supporting structure (2) is joined to the housing part (1) in a positive-locking manner by means of plug joints or snap joints (6).

11. The lightweight component of claim 1 wherein the supporting structure (2) is joined to the housing part (1) in a material-locked manner by at least one of bonded joints and welded joints.

12. The lightweight component of claim 1 wherein at least one of the housing part (1), the cover plate (4) and covering shell (20) comprises a material selected from metal sheet, diecast parts, fibre-reinforced plastic and composites.

13. The lightweight component of claim 1 wherein the plastic of the supporting structure (2) is selected from a reinforced thermoplastic material and a filled thermoplastic material.

14. The lightweight component of claim 1 wherein at least one of the housing part (1), the cover plate (4) and the covering shell (20) have openings to an interior space formed by said housing part (1) and cover plate (4) or covering shell (20).

15. The lightweight component of claim 1 wherein the supporting structure (2) is only laid in the housing part (1).

16. The lightweight component of claim 1 wherein said lightweight component is a vehicle or aircraft component selected from the group consisting of longitudinal girder, cross girder, underbody component, suspension arm, energy absorbing side wall, energy absorbing front wall and bumper bar.

17. The lightweight component of claim 1 wherein said lightweight component is a girder joining junction element.

18. A method of producing a lightweight plastic/metal composite component comprising, at least one shell-shaped housing part (1) made of a material selected from at least one of plastic and metal, and having a boundary (10), at least one cover plate (4) or covering shell (20) made of metal, each of said cover plate (4) and said covering shell (20) having a peripheral region, and a plastic ribbed supporting structure (2) enclosed by said housing part (1) and said cover plate (4) or covering shell (20), wherein said method comprises,
providing said supporting structure (2) on and in abutment with the inside of said housing part (1), and
joining the boundary (10) of said housing part (1) to the peripheral region of said cover plate (4) or covering shell (20).

19. The method of claim 18 wherein the supporting structure (2) is provided on the inside of the housing part (1) by injection moulding said supporting structure (2) on to the interior wall of housing part (1), the ribs of supporting structure (2) being joined to housing part (1) by means of positive locks which are a component of the supporting structure (2).

20. The method of claim 18 wherein the cover plate (4) or the covering shell (20) is provided, prior to joining with the housing part (1), with its own supporting structure made of plastic and is partly or completely oversprayed or sheathed with plastic.

21. The method of claim 18 wherein the cover plate (4) or covering shell (20) is mutually joined to the housing part (1) in a positive-locking manner at points situated directly on top of one another, in a region of perforations (3), by means of thermoplastic material.

22. The method of claim 18 wherein the supporting structure (2) comprises ribs, and the covering shell (20) or the cover plate (4) is joined to at least one of the supporting structure (2) and the housing part (1) by welding or by means of plastic studs provided on the ribs of the supporting structure (2), the plastic studs being reshaped to form plastic rivets which engage in a positive-locking manner in reentrants of at least one of the housing part (1), of the covering shell (20) and of the cover plate (4).

23. The method of claim 18 wherein the covering shell (20) or the cover plate (4) is joined to at least one of the supporting structure (2) and the housing part (1) by welded surfaces situated above one another, the welded surfaces being formed by welding edges situated above one another by at least on method selected from the group consisting of spot welding, bonding, flanging, clinching, riveting, plastic riveting, and stud welding of plastic studs.

24. The method of claim 18 wherein the supporting structure (2) is anchored to the housing part (1) in a positive-locking manner by plugging or snapping prior to joining the cover plate (4) or covering shell (20) to the housing part (1).

25. The method of claim 18 wherein the supporting structure (2) is joined to the housing part (1) in a material-locked manner by at least one of bonding and welding prior to joining the cover plate (4) or covering shell (20) to the housing part (1).

26. The lightweight component of claim 12 wherein the metal sheet is selected from steel sheet and aluminum sheet, and the diecast parts are made of a metal selected from aluminum, zinc and magnesium.

27. The lightweight component of claim 13 wherein the plastic of the supporting structure (2) is selected from at least one of polycarbonate, polyester, polyurethane, polystyrene, acrylonitrile-butadiene-styrene graft copolymer, polyamide, polybutylene terephthalate and polypropylene.

* * * * *